United States Patent
Saito et al.

(10) Patent No.: US 9,217,486 B2
(45) Date of Patent: Dec. 22, 2015

(54) MAGNETORHEOLOGICAL FLUID SHOCK ABSORBER

(71) Applicant: KAYABA INDUSTRY CO., LTD., Tokyo (JP)

(72) Inventors: Keiji Saito, Tokyo (JP); Kazuhisa Nakamura, Kanagawa (JP); Takashi Teraoka, Gifu (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/379,173

(22) PCT Filed: Feb. 18, 2013

(86) PCT No.: PCT/JP2013/053865
§ 371 (c)(1),
(2) Date: Aug. 15, 2014

(87) PCT Pub. No.: WO2013/129161
PCT Pub. Date: Sep. 6, 2013

(65) Prior Publication Data
US 2015/0021130 A1 Jan. 22, 2015

(30) Foreign Application Priority Data
Mar. 1, 2012 (JP) .................. 2012-045743

(51) Int. Cl.
*F16F 9/53* (2006.01)
*F16F 9/19* (2006.01)

(52) U.S. Cl.
CPC .. *F16F 9/535* (2013.01); *F16F 9/19* (2013.01)

(58) Field of Classification Search
CPC ........... F16F 9/19; F16F 9/535; F16F 9/0227; F16F 9/3214
See application file for complete search history.

(56) References Cited

U.S. PATENT DOCUMENTS

| | | | | |
|---|---|---|---|---|
| 5,810,130 A * | 9/1998 | McCandless | ............ | 188/322.22 |
| 6,209,691 B1 * | 4/2001 | Fehring et al. | ........... | 188/322.15 |
| 6,318,526 B1 * | 11/2001 | Kruckemeyer et al. | .. | 188/322.17 |
| 6,612,409 B2 * | 9/2003 | Lun et al. | .................... | 188/267.2 |
| 6,637,557 B2 * | 10/2003 | Oliver et al. | ................ | 188/267.2 |
| 6,655,511 B1 * | 12/2003 | Lun et al. | ....................... | 188/267 |
| 7,958,979 B2 * | 6/2011 | Sekiya et al. | .............. | 188/267.2 |
| 8,051,961 B2 * | 11/2011 | Azekatsu et al. | ........... | 188/267.2 |

(Continued)

FOREIGN PATENT DOCUMENTS

| | | |
|---|---|---|
| JP | 2008-002614 A | 1/2008 |
| JP | 2008-175364 A | 7/2008 |

(Continued)

*Primary Examiner* — Thomas Irvin
(74) *Attorney, Agent, or Firm* — Rabin & Berdo, P.C.

(57) ABSTRACT

A magnetorheological fluid shock absorber includes a piston slidably arranged in a cylinder in which magnetorheological fluid is sealed. The piston includes a piston core which is attached to an end part of a piston rod and on the outer periphery of which a coil is provided, a flux ring which surrounds the outer periphery of the piston core and forms a flow passage for the magnetorheological fluid between the piston core and the flux ring, a first plate which is arranged on the outer periphery of the piston rod and specifies the position of one end of the flux ring in an axial direction with respect to the piston core, a second plate which is arranged on the inner periphery of the other end of the flux ring, and a first snap ring which is fitted to the inner periphery of the flux ring and fixes the second plate.

10 Claims, 3 Drawing Sheets

(56) References Cited

U.S. PATENT DOCUMENTS

| | | |
|---|---|---|
| 8,286,763 B2 * | 10/2012 | Nehl et al. ................. 188/267.2 |
| 9,004,243 B2 * | 4/2015 | Nehl et al. ................. 188/267.2 |
| 2008/0251982 A1 | 10/2008 | Sekiya et al. |
| 2009/0107779 A1 | 4/2009 | Azekatsu et al. |
| 2015/0008081 A1 * | 1/2015 | Saito et al. ................... 188/267 |
| 2015/0204407 A1 * | 7/2015 | Lun ......................... 188/322.16 |

FOREIGN PATENT DOCUMENTS

| | | |
|---|---|---|
| JP | 2009-133472 A | 6/2009 |
| JP | 2009-150411 A | 7/2009 |
| JP | 2010-019326 A | 1/2010 |

* cited by examiner

MAGNETORHEOLOGICAL FLUID SHOCK ABSORBER

CROSS-REFERENCE TO RELATED APPLICATIONS

This Application is a continuation of International Application PCT/JP2013/053865 filed on Feb. 18, 2013, and claims priority to Japanese Patent Application No. 2012-045743, filed on Mar. 1, 2012, the contents of which are entirely incorporated herein by reference for all purposes.

TECHNICAL FIELD

The present invention relates to a magnetorheological fluid shock absorber utilizing magnetorheological fluid whose apparent viscosity changes by the action of a magnetic field.

BACKGROUND ART

A shock absorber which changes a damping force by causing a magnetic field to act on a flow passage in which the magnetorheological fluid passes and changing an apparent viscosity of magnetorheological fluid is known as a shock absorber installed in a vehicle such as an automotive vehicle. JP2008-175364A discloses a magnetorheological fluid shock absorber in which magnetorheological fluid passes in a flow passage formed between a piston core having a coil wound on the outer periphery thereof and a piston ring arranged on the outer periphery of the piston core when a piston assy including the piston core and the piston ring slides in a cylinder.

SUMMARY OF INVENTION

However, in the magnetorheological fluid shock absorber of JP2008-175364A, a pair of plates for sandwiching the piston ring in an axial direction are provided and each plate is fixed by fastening a nut to arrange the piston ring at a predetermined position with respect to the piston core. Since the piston ring is fixed by being sandwiched by the plates and the nuts from opposite end sides in this way, the entire length of the piston assy becomes longer, which may lead to a shorter stroke length of the piston assy.

The present invention was developed in view of the above problem and aims to shorten the entire length of a piston of a magnetorheological fluid shock absorber.

According to one aspect of this invention, a magnetorheological fluid shock absorber, includes: a cylinder in which magnetorheological fluid whose viscosity changes by the action of a magnetic field is sealed; a piston which is slidably arranged in the cylinder and defines a pair of fluid chambers in the cylinder; and a piston rod which is coupled to the piston and extends to the outside of the cylinder. The piston includes: a piston core which is attached to an end part of the piston rod and on the outer periphery of which a coil is provided; a flux ring which surrounds the outer periphery of the piston core and forms a flow passage for the magnetorheological fluid between the piston core and the flux ring; a first plate which is formed into an annular shape and arranged on the outer periphery of the piston rod and specifies the position of one end of the flux ring in an axial direction with respect to the piston core; a second plate which is arranged on the inner periphery of the other end of the flux ring and held in contact with the piston core; and a first snap ring which is fitted to the inner periphery of the flux ring and fixes the second plate in the axial direction.

The details as well as other features and advantages of this invention are set forth in the remainder of the specification and are shown in the accompanying drawings.

DESCRIPTION OF EMBODIMENTS

Hereinafter, an embodiment of the present invention is described with reference to the drawings.

Figure 1:
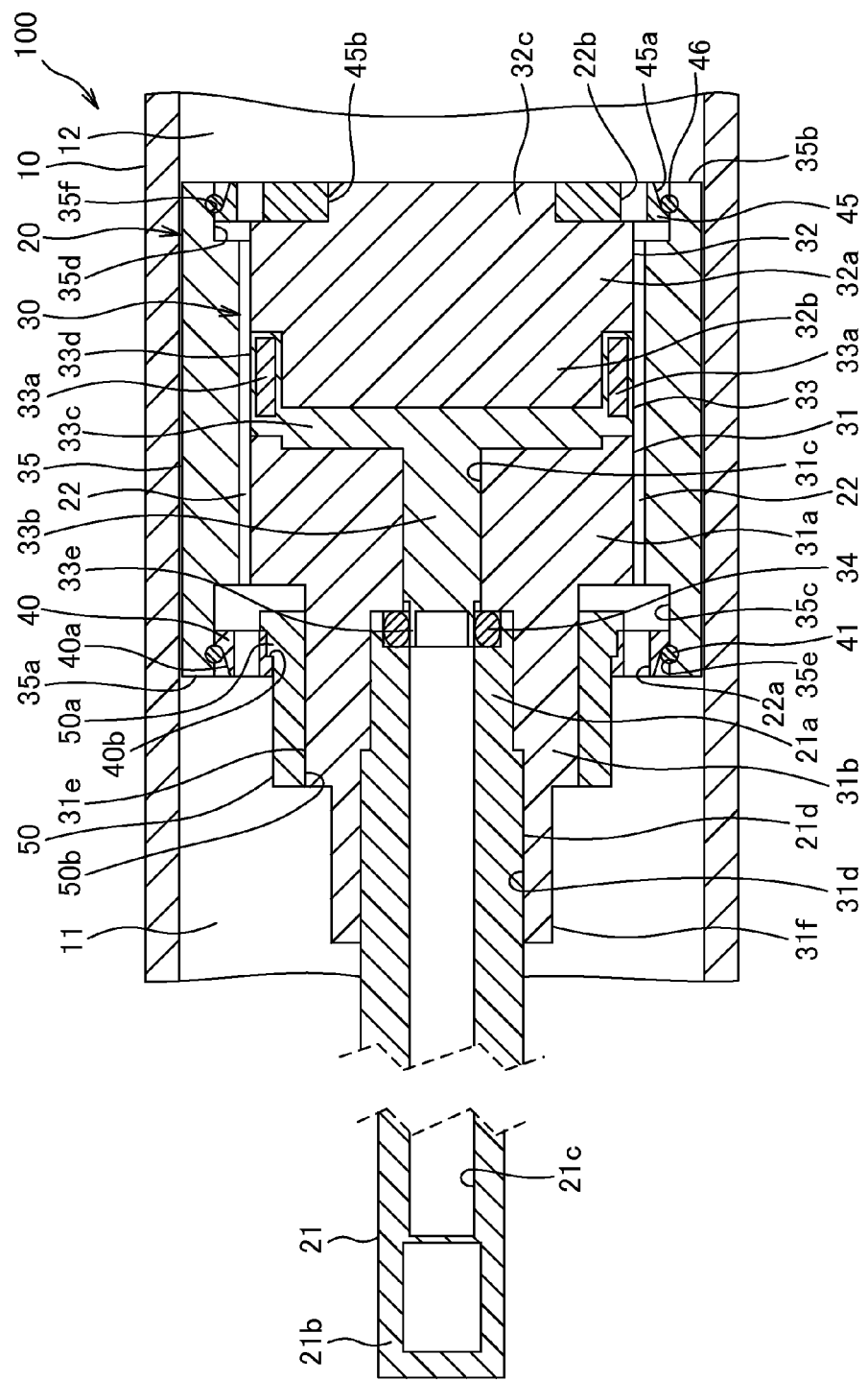
FIG. 1 is a front sectional view of a magnetorheological fluid shock absorber according to an embodiment of the present invention.

First, the overall configuration of a magnetorheological fluid shock absorber 100 according to the embodiment of the present invention is described with reference to FIG. 1.

The magnetorheological fluid shock absorber 100 is a shock absorber whose damping coefficient is variable due to the use of magnetorheological fluid whose viscosity changes by the action of a magnetic field. The magnetorheological fluid shock absorber 100 includes a cylinder 10 in which the magnetorheological fluid is sealed, a piston 20 which is slidably arranged in the cylinder 10 and a piston rod 21 which is coupled to the piston 20 and extends to the outside of the cylinder 10.

The cylinder 10 is formed into a bottomed cylindrical shape. The magnetorheological fluid sealed in the cylinder 10 is liquid whose apparent viscosity changes by the action of a magnetic field and in which ferromagnetic fine particles are dispersed in liquid such as oil. A viscosity of the magnetorheological fluid changes according to an intensity of the acting magnetic field and returns to an initial state when there is no more influence of the magnetorheological fluid.

The piston 20 defines a fluid chamber 11 and a fluid chamber 12 in the cylinder 10. The piston 20 includes an annular flow passage 22 which enables a movement of the magnetorheological fluid between the fluid chambers 11 and 12. The piston 20 can slide in the cylinder 10 by the passage of the magnetorheological fluid in the flow passage 22. The configuration of the piston 20 is described in detail later.

The piston rod 21 is formed coaxially with the piston 20. One end 21a of the piston rod 21 is fixed to the piston 20 and another end 21b thereof extends to the outside of the cylinder 10. The piston rod 21 is formed into such a bottomed cylindrical shape that the one end 21a is open and the other end 21b is closed. A pair of wires (not shown) for supplying a current to a coil 33a of the piston 20 to be described later are passed along an inner periphery 21c of the piston rod 21. An external thread 21d to be threadably engaged with the piston 20 is formed on the outer periphery of the piston rod 21 near the one end 21a.

Next, the configuration of the piston 20 is described with reference to FIGS. 1 to 3.

The piston 20 includes a piston core 30 which is attached to an end part of the piston rod 21 and on the outer periphery of which the coil 33a is provided, and a flux ring 35 which surrounds the outer periphery of the piston core 30 and forms the flow passage 22 for the magnetorheological fluid between the piston core 30 and the flux ring 35. The piston 20 includes a first plate 40 which is arranged on the inner periphery of one end 35a of the flux ring 35, a second plate 45 which is arranged on the inner periphery of another end 35b of the flux ring 35 and held in contact with the piston core 30, and a holder 50 which supports the first plate 40 and presses the second plate 45 against the piston core 30 via the flux ring 35.

Further, the piston 20 includes a C-ring 46 as a first snap ring which fixes the second plate 45 in an axial direction by being fitted to the inner periphery of the flux ring 35 and a C-ring 41 as a second snap ring which fixes the first plate 40 in the axial direction by being fitted to the inner periphery of the flux ring 35.

The piston core 30 includes a first core 31 which is mounted on an end part of the piston rod 21, a second core 32 which is held in contact with the second plate 45, and a coil assembly 33 which is sandwiched between the first and second cores 31, 32 and on the outer periphery of which the coil 33a is provided.

The first core 31 includes a large diameter portion 31a whose outer periphery faces the inner periphery of the flux ring 35, a small diameter portion 31b which is formed to have a smaller diameter than the large diameter portion 31a, and a through hole 31c which penetrates through a center in the axial direction.

The large diameter portion 31a is formed into a cylindrical shape. The outer periphery of the large diameter portion 31a faces the flow passage 22 in which the magnetorheological fluid passes. The large diameter portion 31a is held in contact with the coil assembly 33. A cylindrical portion 33b of the coil assembly 33 to be described later is inserted and fitted into the through hole 31c of the large diameter portion 31a.

The small diameter portion 31b is formed continuously and coaxially with the large diameter portion 31a. The small diameter portion 31b is formed into a cylindrical shape projecting in the axial direction from the flux ring 35. An internal thread 31d to be threadably engaged with the external thread 21d of the piston rod 21 is formed on the inner periphery of the small diameter portion 31b.

An external thread 31e to be threadably engaged with the holder 50 is formed on the outer periphery of the small diameter portion 31b. A thin portion 31f for facilitating the mounting of the holder 50 is formed on the outer periphery of a tip part of the small diameter portion 31b.

The second core 32 includes a large diameter portion 32a whose outer periphery faces the inner periphery of the flux ring 35 and a first small diameter portion 32b and a second small diameter portion 32c which are located on opposite ends of the large diameter portion 32a and formed to have a smaller diameter than the large diameter portion 32a.

The large diameter portion 32a is formed into a cylindrical shape. The large diameter portion 32a is formed to have the same diameter as the large diameter portion 31a of the first core 31. The outer periphery of the large diameter portion 32a faces the flow passage 22 in which the magnetorheological fluid passes.

The first small diameter portion 32b is formed into a cylindrical shape coaxial with the large diameter portion 32a. The first small diameter portion 32b is formed to have the same diameter as the inner periphery of a coil molding portion 33d of the coil assembly 33 to be described later and fitted to the inner periphery of the coil molding portion 33d.

The second small diameter portion 32c is formed into a cylindrical shape coaxial with the large diameter portion 32a. The second small diameter portion 32c is formed on an end part of the second core 32 opposite to the first small diameter portion 32b. An end surface of the second small diameter portion 32c is formed to be flush with an end surface of the other end 35b of the flux ring 35.

The coil assembly 33 is formed by molding in a state where the coil 33a is inserted. The coil assembly 33 includes a cylindrical portion 33b to be fitted into the through hole 31c of the first core 31, a flat plate portion 33c to be sandwiched between the first core 31 and the second core 32 and the coil molding portion 33d having the coil 33a provided inside.

The coil 33a forms a magnetic field by an externally supplied current. An intensity of this magnetic field increases with an increase in the current supplied to the coil 33a. When the current is supplied to the coil 33a and the magnetic field is formed, the apparent viscosity of the magnetorheological fluid flowing in the flow passage 22 changes. The viscosity of the magnetorheological fluid increases with an increase in the intensity of the magnetic field by the coil 33a.

A tip part 33e of the cylindrical portion 33b is fitted to the inner periphery of the piston rod 21. A pair of wires for supplying a current to the coil 33a are pulled out from the tip of the cylindrical portion 33b. An O-ring 34 as a sealing member is provided between the tip part 33e of the cylindrical portion 33b and the one end 21a of the piston rod 21.

The O-ring 34 is axially compressed by the large diameter portion 31a of the first core 31 and the piston rod 21 and radially compressed by the tip part 33e of the coil assembly 33 and the piston rod 21. This prevents the magnetorheological fluid having intruded into between the outer periphery of the piston rod 21 and the first core 31 and between the first core 31 and the coil assembly 33 from flowing out to the inner periphery of the piston rod 21 and leaking therefrom.

The flat plate portion 33c is formed into a disk shape continuous and coaxial with a base end part of the cylindrical portion 33b. The pair of wires for supplying the current to the coil 33a passes through the flat plate portion 33c and the cylindrical portion 33b.

The coil molding portion 33d is annularly raised on an outer edge part of the flat plate portion 33c. The coil molding portion 33d is formed to project from an end part of the coil assembly 33 opposite to the cylindrical portion 33b. The coil molding portion 33d is formed to have the same diameter as the large diameter portion 31a of the first core 31. The outer periphery of the coil molding portion 33d faces the flow passage 22 in which the magnetorheological fluid passes. The coil 33a is provided in the coil molding portion 33d.

As just described, the piston core 30 is formed by being divided into three members, i.e. the first core 31, the second core 32, and the coil assembly 33. Thus, only the coil assembly 33 provided with the coil 33a may be formed by molding and sandwiched between the first core 31 and the second core 32. Thus, the piston core 30 is easily formed as compared with the case where a molding operation is performed by forming the piston core 30 by a single member.

In the piston core 30, the first core 31 is fixed to the piston rod 21, but the coil assembly 33 and the second core 32 are only fitted in the axial direction. Accordingly, in the piston 20, the flux ring 35, the first plate 40, the second plate 45, and the holder 50 are provided, and the coil assembly 33 and the second core 32 are fixed by being pressed against the first core 31.

The flux ring 35 is formed into a substantially cylindrical shape. The outer periphery of the flux ring 35 is formed to have substantially the same diameter as the inner periphery of the cylinder 10. The inner periphery of the flux ring 35 faces the outer periphery of the piston core 30. The inner periphery of the flux ring 35 is formed to have a larger diameter than the outer periphery of the piston core 30 and forms the flow passage 22 between the piston core 30 and this inner periphery. The flux ring 35 is coaxially fixed to the piston core 30 by the first plate 40, the second plate 45, and the holder 50.

The flux ring 35 includes a large diameter portion 35c which is formed on the inner periphery of the one end 35a and into which the first plate 40 is to be fitted, and a large diameter portion 35d which is formed on the inner periphery of the other end 35b and into which the second plate 45 is to be fitted.

The large diameter portion 35c is formed to have substantially the same diameter as the outer diameter of the first plate 40. The large diameter portion 35c is formed to be longer than the thickness of the first plate 40. On the inner periphery of the large diameter portion 35c, an annular groove 35e shaped in conformity with the outer shape of the C-ring 41 is formed in accordance with a position where the C-ring 41 is provided.

The large diameter portion 35d is formed to have substantially the same diameter as the outer diameter of the second plate 45. The large diameter portion 35d is formed to be longer than the thickness of the second plate 45. On the inner periphery of the large diameter portion 35d, an annular groove 35f shaped in conformity with the outer shape of the C-ring 46 is formed in accordance with a position where the C-ring 46 is provided.

The first plate 40 is for specifying the position of the one end 35a of the flux ring 35 in the axial direction with respect to the piston core 30. The first plate 40 is formed into an annular shape and arranged on the outer periphery of the piston rod 21 via the holder 50. An outer peripheral surface 40a of the first plate 40 is formed into a tapered shape reduced in diameter toward an end part of the piston 20.

Figure 2:
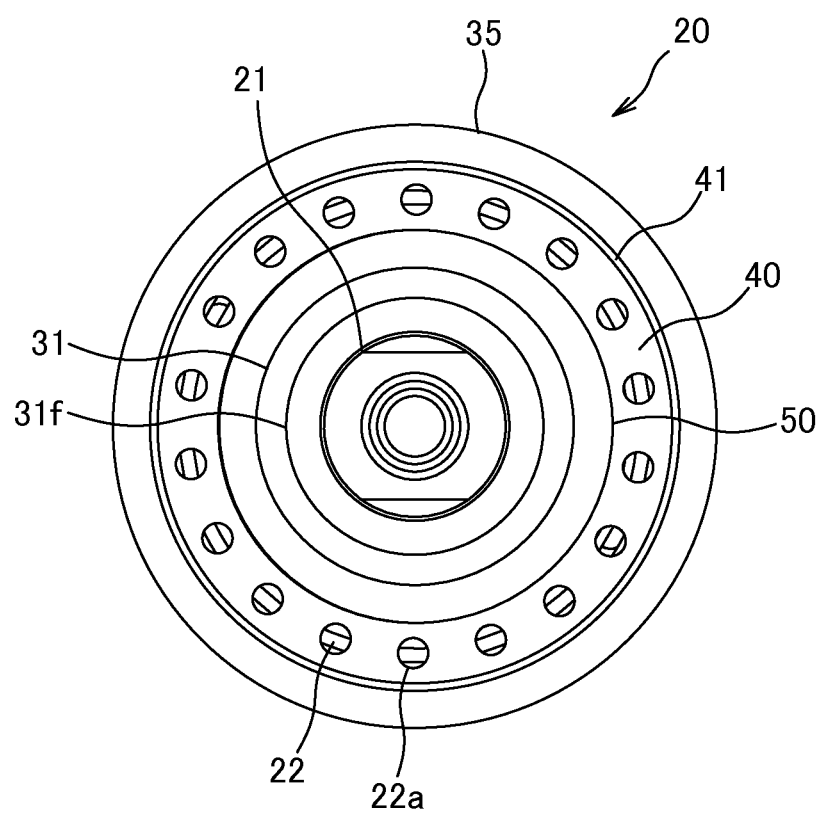
FIG. 2 is a left side view of a piston in FIG. 1.

As shown in FIG. 2, the first plate 40 includes a plurality of flow passages 22a which are through holes communicating with the flow passage 22. The flow passages 22a are circularly formed and annularly arranged at equal intervals.

A step portion 40b with which an annular step portion 50a of the holder 50 to be described later is engaged is formed on the inner periphery of the first plate 40. The position of the first plate 40 in the axial direction with respect to the piston core 30 is specified by a fastening force of the holder 50 to the first core 31 and the first plate 40 is supported in the end part of the piston 20.

The C-ring 41 is a ring formed to have a circular cross-section. The C-ring 41 is formed into a C-shaped ring the circumference of which is partly open. The C-ring 41 is fitted into the annular groove 35e by a force trying to expand toward an outer peripheral side. The C-ring 41 prevents the first plate 40 from coming off from the flux ring 35 and specifies the position of the first plate 40 in the axial direction by being held in contact with the outer peripheral surface 40a of the first plate 40.

The holder 50 is formed into a substantially cylindrical shape and fastened to the outer periphery of the small diameter portion 31b of the first core 31 to support the first plate 40. The holder 50 presses the second plate 45 against the second core 32 via the flux ring 35 by a fastening force between the small diameter portion 31b and the holder 50. The holder 50 is mounted to form a clearance between the large diameter portion 31a of the first core 31 and the holder 50 in a state where the piston 20 is assembled. The holder 50 includes the annular step portion 50a projecting on the outer periphery of an end part and an internal thread 50b formed on the inner periphery.

The annular step portion 50a is formed on the end part facing the large diameter portion 31a of the first core 31. The annular step portion 50a specifies the position of the first plate 40 in the axial direction by being engaged with the step portion 40b of the first plate 40.

The internal thread 50b is threadably engaged with the external thread 31e of the first core 31. The holder 50 is mounted movably back and forth in the axial direction by the threadable engagement of the internal thread 50b and the external thread 31e.

The second plate 45 is formed into an annular shape and arranged on the inner periphery of the other end 35b of the flux ring 35. An outer peripheral surface 45a of the second plate 45 is formed into a tapered shape reduced in diameter toward an end part of the piston 20.

Figure 3:
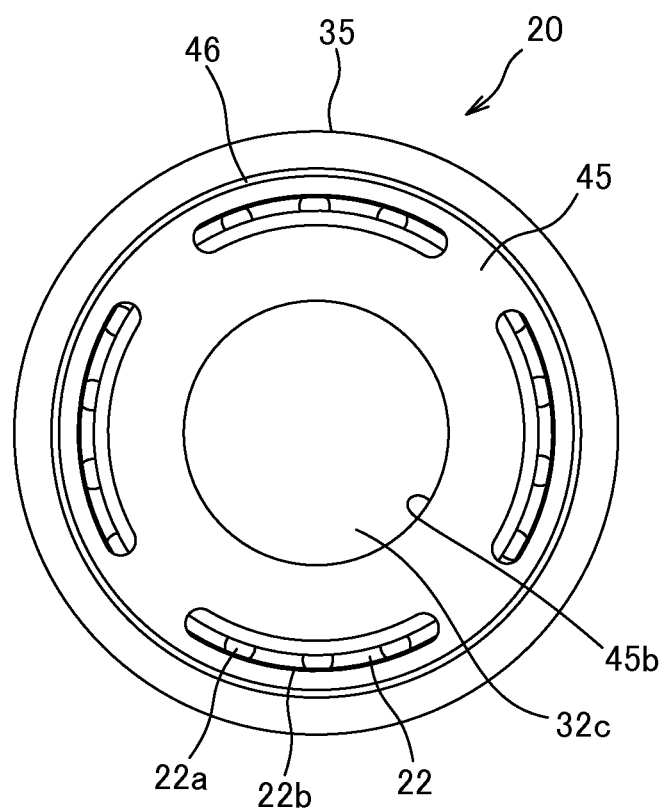
FIG. 3 is a right side view of the piston in FIG. 1.

As shown in FIG. 3, the second plate 45 includes a plurality of flow passages 22b which are through holes communicating with the flow passage 22. The flow passages 22b are arcuately formed and annularly arranged at equal intervals. As just described, the flow passages 22a of the first plate 40 are circularly formed and the flow passages 22b of the second plate 45 are arcuately formed. By this, the flow passages 22a, 22b can be allowed to linearly communicate via the flow passage 22 regardless of mounting angles of the first and second plates 40, 45.

A through hole 45b into which the second small diameter portion 32c of the second core 32 is to be fitted is formed on the inner periphery of the second plate 45. Coaxiality between the second plate 45 and the second core 32 is ensured by fitting the second small diameter portion 32c into the through hole 45b.

The C-ring 46 is a ring formed to have a circular cross-section. The C-ring 46 is formed into a C-shaped ring the circumference of which is partly open. The C-ring 46 is fitted into the annular groove 35f by a force trying to expand toward an outer peripheral side. The C-ring 46 prevents the second plate 45 from coming off from the flux ring 35 and specifies the position of the second plate 45 in the axial direction by being held in contact with the outer peripheral surface 45a of the second plate 45.

As described above, the position of the one end 35a of the flux ring 35 in the axial direction with respect to the piston core 30 is specified by the first plate 40 and the other end 35b is fixed in the axial direction by fitting the second plate 45 to the inner periphery of the flux ring 35 by the C-ring 46. In this way, the flux ring 35 is fixed in the axial direction with respect to the piston core 30. Thus, it is not necessary to provide another member projecting in the axial direction from the other end 35b of the flux ring 35 to specify the axial position of the flux ring 35. Therefore, the entire length of the piston 20 of the magnetorheological fluid shock absorber 100 can be shortened.

An assembling procedure of the piston 20 is described below.

First, the first core 31 is mounted on the piston rod 21. Specifically, the external thread 21d of the piston rod 21 and the internal thread 31d of the first core 31 are threadably engaged. At this time, the O-ring 34 is inserted in advance between the tip part 33e of the piston rod 21 and the one end 21a of the piston rod 21.

Subsequently, the coil assembly 33 is attached to the first core 31. The cylindrical portion 33b of the coil assembly 33 is inserted into the through hole 31c of the first core 31 and the pair of wires for supplying the current to the coil 33a are pulled out to the inner periphery 21c of the piston rod 21.

Then, the second core 32 is attached to the coil assembly 33. Specifically, the second core 32 is so attached that the first small diameter portion 32b of the second core 32 is fitted to the inner periphery of the coil molding portion 33d of the coil assembly 33. In this way, the assembling of the piston core 30 is completed. At this time, the holder 50 is mounted in advance on the outer periphery of the first core 31. The holder 50 is mounted at such a deep position that the end part formed with the annular step portion 50a comes into contact with the large diameter portion 31a of the first core 31.

Subsequently, the flux ring 35 is mounted on the outer periphery of the piston core 30. In this state, the flux ring 35 is movable in the axial direction relative to the piston core 30.

Then, the first plate 40 is inserted into the large diameter portion 35c on the inner periphery of the one end 35a of the flux ring 35 and the C-ring 41 is fitted. Similarly, the second plate 45 is inserted into the large diameter portion 35d on the inner periphery of the other end 35b of the flux ring 35 and the C-ring 46 is fitted. This prevents the first and second plates 40, 45 from coming off from the piston 20.

In this state, the first and second plates 40, 45 are movable inwardly of the piston 20 since the holder 50 is mounted at the deep position on the piston core 30. Thus, the C-rings 41, 46 can be easily mounted.

Finally, the holder 50 is fastened by being rotated to project from the flux ring 35. In this way, the first plate 40 is pulled toward the one end 35a of the flux ring 35 by the engagement of the step portion 40b and the annular step portion 50a. Then, the flux ring 35 is pulled toward the first plate 40 via the C-ring 41 and the second plate 45 is also pulled toward the first plate 40 via the C-ring 46.

As just described, the second core 32 and the coil assembly 33 of the piston core 30 are fixed by being pressed against the first core 31 by the fastening force of the holder 50 to the first core 31. Thus, the piston 20 can be easily assembled only by fastening the holder 50. Further, since each member of the piston 20 can be firmly fixed by the fastening force of the holder 50, the rotation of each member is prevented and vibration is suppressed.

It should be noted that, in the present embodiment, the piston 20 is divided into the three members, i.e. the first core 31, the second core 32 and the coil assembly 33. However, instead of this configuration, the first core 31 and the coil assembly 33 may be integrally formed so that the piston 20 is composed of two members or the second core 32 and the coil assembly 33 may be integrally formed so that the piston 20 is composed of two members.

According to the above embodiment, the following effects are achieved.

The position of the one end 35a of the flux ring 35 in the axial direction with respect to the piston core 30 is specified by the first plate 40 and the other end 35b is fixed in the axial direction by fitting the second plate 45 to the inner periphery of the flux ring 35 by the C-ring 46. In this way, the flux ring 35 is fixed in the axial direction with respect to the piston core 30. Thus, it is not necessary to provide another member projecting in the axial direction from the other end 35b of the flux ring 35 to specify the axial position of the flux ring 35. Therefore, the entire length of the piston 20 of the magnetorheological fluid shock absorber 100 can be shortened.

Further, the piston core 30 is formed by being divided into three members, i.e. the first core 31, the second core 32 and the coil assembly 33. Thus, only the coil assembly 33 provided with the coil 33a may be formed by molding and sandwiched between the first core 31 and the second core 32. Therefore, the piston core 30 is easily formed as compared with the case where a molding operation is performed by forming the piston core 30 by a single member.

The second core 32 and the coil assembly 33 of the piston core 30 are fixed by being pressed against the first core 31 by the fastening force of the holder 50 to the first core 31. Thus, the piston 20 can be easily assembled only by fastening the holder 50.

Embodiments of this invention were described above, but the above embodiments are merely examples of applications of this invention, and the technical scope of this invention is not limited to the specific constitutions of the above embodiments.

For example, in the magnetorheological fluid shock absorber 100, the pair of wires for supplying the current to the coil 33a pass along the inner periphery of the piston rod 21. Thus, a ground for allowing the current applied to the coil 33a to escape to the outside can be eliminated. However, instead of this configuration, the current may be grounded to the outside through the piston rod 21 itself by letting only one wire for applying the current to the coil 33a pass through the interior of the piston rod 21.

This application claims priority based on Japanese Patent Application No. 2012-045743 filed with the Japan Patent Office on Mar. 1, 2012, the entire contents of which are incorporated into this specification.

The embodiments of this invention in which an exclusive property or privilege is claimed are defined as follows:

The invention claimed is:
1. A magnetorheological fluid shock absorber comprising:
a cylinder having sealed therein a magnetorheological fluid whose viscosity changes with an action of a magnetic field;
a piston slidably arranged in the cylinder, and defining a pair of fluid chambers in the cylinder; and
a piston rod coupled to the piston, and extending outside of the cylinder;
wherein the piston includes:
a piston core attached to an end part of the piston rod, the piston core having a coil disposed on an outer periphery of the piston core;
a flux ring surrounding the outer periphery of the piston core, and defining a flow passage for the magnetorheological fluid between the piston core and the flux ring;
a first plate having an annular shape and disposed on an outer periphery of the piston rod, and a position of the first plate indicating a position of one end of the flux ring in an axial direction with respect to the piston core;
a second plate disposed on an inner periphery of another end of the flux ring; and
a first snap ring fitted to the inner periphery of the flux ring between the flux ring and the second plate, and fixing the second plate in the axial direction in contact with the piston core.

2. The magnetorheological fluid shock absorber according to claim 1, further comprising:
a second snap ring fitted to the inner periphery of the flux ring, the second snap ring fixing the first plate in the axial direction,
wherein the first plate is disposed on the inner periphery of the one end of the flux ring.

3. The magnetorheological fluid shock absorber according to claim 2, wherein:
a pair of annular grooves are disposed on the inner periphery of the flux ring respectively corresponding to positions where the first and second snap rings are disposed; and
the first and second snap rings are fitted in the annular grooves.

4. The magnetorheological fluid shock absorber according to claim 2, wherein:
the first and second snap rings each have a C-shaped ring shape and a circumference which is partly open; and outer peripheral surfaces of the first and second plates each have a tapered shape and a reduced in diameter toward an end part of the piston.

5. The magnetorheological fluid shock absorber according to claim 1, wherein the piston core includes:
   a first core attached to an end part of the piston rod;
   a second core held in contact with the second plate; and
   a coil assembly disposed on the outer periphery of the piston core and having portions thereof sandwiched between the first and second cores; and
   a holder fastened to the outer periphery of the first core to support the first plate and press the second plate against the second core via the flux ring by a fastening force.

6. The magnetorheological fluid shock absorber according to claim 5, wherein the first core includes:
   a large diameter portion having an outer periphery that faces the inner periphery of the flux ring;
   a small diameter portion having a smaller diameter than the large diameter portion of the first core; and
   a through hole penetrating through a center of the first core in an axial direction.

7. The magnetorheological fluid shock absorber according to claim 6, wherein the second core includes:
   a large diameter portion having an outer periphery that faces the inner periphery of the flux ring;
   a first small diameter portion; and
   a second small diameter portion, the first and second small diameter portions of the second core
      being disposed on opposite ends of the large diameter portion of the second core, and
      each having a smaller diameter than the large diameter portion of the second core.

8. The magnetorheological fluid shock absorber according to claim 6, further comprising:
   a cylindrical portion of the coil assembly disposed in the through hole of the first core.

9. The magnetorheological fluid shock absorber according to claim 7, wherein the large diameter portion of the second core is the same size as the large diameter portion of the second core.

10. The magnetorheological fluid shock absorber according to claim 1, wherein the coil is configured to generate the magnetic field in response to receiving a current.

\* \* \* \* \*